United States Patent Office 3,463,683
Patented Aug. 26, 1969

3,463,683
EXPLOSIVE WITH BINDER OF A VINYL CHLORIDE COPOLYMER AND STARCH AND METHOD OF MAKING SAME
David Pelton Moore, Marlow, N.H., assignor to The Universal Ordnance and Power Company, a corporation of the District of Columbia
No Drawing. Original application Nov. 21, 1967, Ser. No. 684,634, now Patent No. 3,409,708, dated Nov. 5, 1968. Divided and this application Apr. 19, 1968, Ser. No. 722,561
Int. Cl. C06b 21/02
U.S. Cl. 149—19     2 Claims

ABSTRACT OF THE DISCLOSURE

This is a solid propellant or an explosive composition in which the binder consists of a vinyl chloride copolymer and starch. The binder ingredients are intimately mixed and heated from 75 to 85° C. to swell the starch and produce a putty-like mass. After the putty-like mass is produced, an oxidant such as ammonium nitrate, chlorate, or perchlorate; potassium nitrate, chlorate, or perchlorate; and sodium nitrate, chlorate, or perchlorate can be added.

---

My present invention relates to improvements in explosives and the methods of making same, this application being a divisional application based on the application Ser. No. 684,634, filed Nov. 21, 1967, now Patent No. 3,409,708, one object of the invention being the production of an explosive as a substitute for dynamite and TNT, as by this method of compounding the ingredients may include chlorates and perchlorates with a binder of starch and an aqueous dispersion of an ignitable burnable adhesive, such as an aqueous dispersion of rubber or a vinyl chloride copolymer or combinations thereof with the aqueous dispersion of rubber.

Another object of the invention is the provision of an explosive that employs any one or combination of the alkali oxidants, such as ammonium nitrate, ammonium chlorate, ammonium perchlorate, potassium nitrate, potassium chlorate, potassium perchlorate, lithium perchlorate, sodium nitrate, sodium chlorate, and sodium perchlorate, with the starch in powder form or blown up as in the Himalaya Patent No. 853,085, combined with an aqueous dispersion of an ignitable burnable adhesive, such as an aqueous dispersion of rubber and/or a vinyl chloride copolymer chloride.

There are many combinations, an example will be set forth below:

EXAMPLE

|   | Percent by wt. |
|---|---|
| Alkali salts as oxidant | 60–90 |
| Starch | 7–20 |
| Copolymer | 4.05–16 |

The starch and the adhesive is mixed thoroughly together and then heated to from 75 to 85° centigrade, but preferably to 80° centigrade, and then the selected oxidant is mixed thoroughly with rigid adhesive to form a putty-like mass, with which a solid propellant can be cast, or it can be made into particles for various selected purposes.

It has been found that several types of chlorates and perchlorates may be combined when pulverized, and chlorates and perchlorates may be combined, 50—50, or 3% chlorate and 70% perchlorate, and when lithium perchlorate is used, potassium or ammonium chlorate will reduce the hygroscopicity of the lithium perchlorate. Also, sodium chlorate will act similarly.

It will thus be seen and understood that any of the oxidants can be used singularly or in combination, that is, two at least and even more in combination, just so long as the starch and copolymers are employed.

What is claimed is:

1. The method of making an explosive mixture comprising intimately mixing an oxidant selected from the group consisting of ammonium nitrate, ammonium chlorate, ammonium perchlorate, potassium chlorate, potassium perchlorate and sodium nitrate, with a binder consisting of a vinyl chloride copolymer and starch, and in which the vinyl chloride copolymer and starch are mixed together intimately and heated to a temperature ranging from 75 to 85° centigrade, to produce a putty-like mass, previously to mixing with said oxidant the starch ranging from 7 to 20% by weight, and the adhesive ranging from 4.05 to 16% by weight, shaping the explosive mixture and drying the shaped explosive.

2. An explosive made in accordance with the method set forth in claim 1.

References Cited

UNITED STATES PATENTS

| Re. 26,108 | 11/1966 | Moore | 149—19 |
| 1,529,322 | 3/1925 | Schapiro | 149—19 X |
| 1,819,457 | 8/1931 | Dehn | 149—19 |
| 2,067,213 | 1/1937 | Snelling | 149—19 |
| 2,333,637 | 11/1943 | Carey | 149—20 X |
| 3,049,452 | 8/1962 | Ratliff et al. | 149—20 X |
| 3,409,708 | 11/1968 | Moore | 264—3 |

CARL D. QUARFORTH, Primary Examiner

S. J. LECHERT, Assistant Examiner

U.S. Cl. X.R.

149—20, 60, 61, 75, 76, 83